(12) United States Patent
Spencer

(10) Patent No.: US 6,633,333 B1
(45) Date of Patent: Oct. 14, 2003

(54) CAMERAS

(75) Inventor: Simon Howard Spencer, Danbury (GB)

(73) Assignee: GEC-Marconi Ltd., Middlesex (GB)

( * ) Notice: Subject to any disclaimer, the term of this patent is extended or adjusted under 35 U.S.C. 154(b) by 0 days.

(21) Appl. No.: 08/942,538

(22) Filed: Oct. 1, 1997

(30) Foreign Application Priority Data

Oct. 2, 1996 (GB) ............................................. 9620838

(51) Int. Cl.$^7$ ........................... H04N 3/14; H04N 5/225; H04N 5/335
(52) U.S. Cl. ...................... 348/272; 348/273; 348/217.1
(58) Field of Search .................. 348/272, 271, 348/273, 274, 275, 276, 277, 280, 241, 242, 252, 253, 217, 222, 223, 225, 270, 256, 292, 342, 263, 630, 631, 624, 713, 222.1, 217.1, 223.1, 225.1; 382/162, 167; 358/512, 513, 515, 517

(56) References Cited

U.S. PATENT DOCUMENTS

| | | | | |
|---|---|---|---|---|
| 4,064,532 A | * | 12/1977 | Yamanaka | 348/275 |
| 4,065,785 A | * | 12/1977 | Adcock et al. | 348/280 |
| 4,107,732 A | * | 8/1978 | Adcock et al. | 348/238 |
| 4,141,036 A | * | 2/1979 | Diehl | 348/277 |
| 4,215,364 A | * | 7/1980 | Takanashi et al. | 348/290 |
| 4,246,601 A | * | 1/1981 | Sato et al. | 348/277 |
| 4,288,812 A | * | 9/1981 | Rhodes | 348/274 |
| 4,404,587 A | * | 9/1983 | Levine | 348/263 |
| 4,417,272 A | * | 11/1983 | Inoue et al. | 348/292 |
| 4,591,900 A | * | 5/1986 | Heeb et al. | 348/277 |
| 4,626,897 A | * | 12/1986 | Sato et al. | 348/273 |
| 4,630,105 A | * | 12/1986 | Knop | 348/278 |
| 4,855,816 A | | 8/1989 | Takanashi et al. | |
| 5,161,008 A | * | 11/1992 | Funk | 348/217 |
| 5,457,494 A | * | 10/1995 | Suga et al. | 348/272 |
| 5,541,653 A | * | 7/1996 | Peters et al. | 348/264 |

FOREIGN PATENT DOCUMENTS

| | | |
|---|---|---|
| EP | 0179339 | 4/1986 |
| EP | 0180131 | 5/1986 |
| EP | 0180946 | 5/1986 |
| EP | 0274820 | 7/1988 |
| GB | 2135853 A | 9/1984 |
| GB | 2318012 | * 4/1998 |

* cited by examiner

Primary Examiner—Aung S. Moe
(74) Attorney, Agent, or Firm—Donald C. Casey, Esq.

(57) ABSTRACT

A camera producing colour video outputs may employ an image intensifier 5 and a monochrome CCD sensor 3. The scene is exposed through filters $F_3$, $F_4$ which may each contain stripes of subtractive primary colours alternating with clear regions. The video is decoded using waveforms derived from a memory which records the output of the sensor when imaged on, for example, primary colours such as red and blue, producing trains of pulses which identify the spatial regions of each line corresponding to the spatial areas of the pattern on the sensor produced by the colour filters $F_3$, $F_4$, in order that actual scenes can be decoded using the stored waveforms, for example using sample and hold devices. A colour interference signal is generated in matrix addition circuitry 10 to produce a luminance signal which has stripe visibility removed from it, permitting high resolution video signals to be obtained.

14 Claims, 6 Drawing Sheets

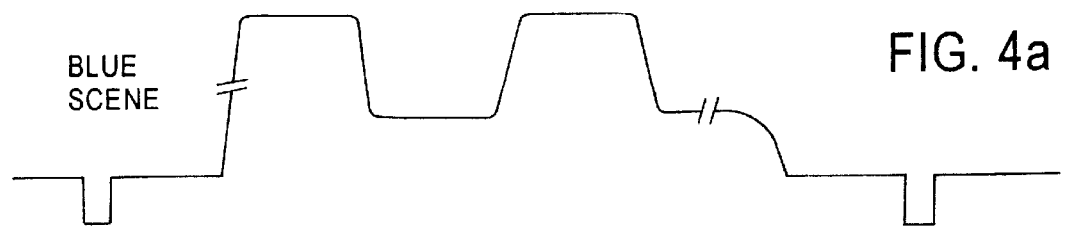
FIG. 4a
FIG. 4b
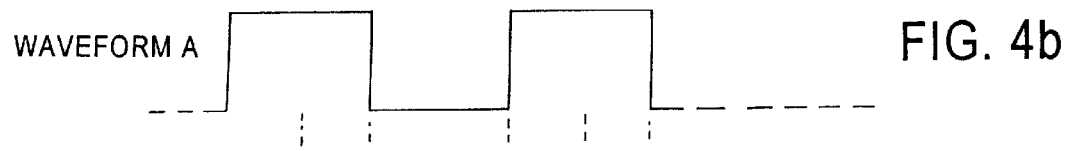
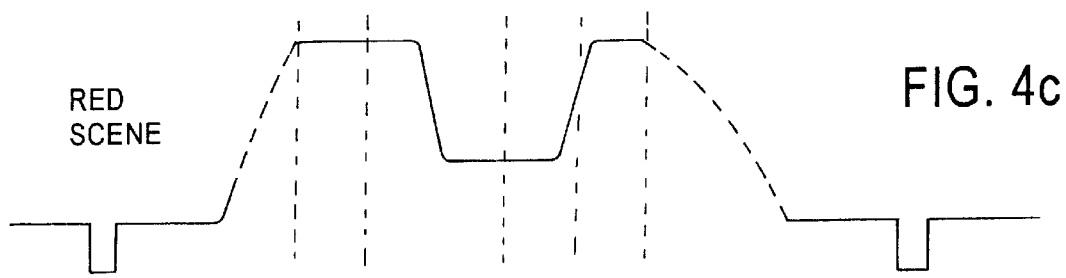
FIG. 4c
FIG. 4d
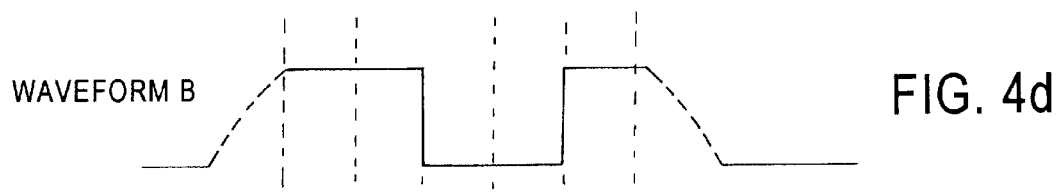
FIG. 4e
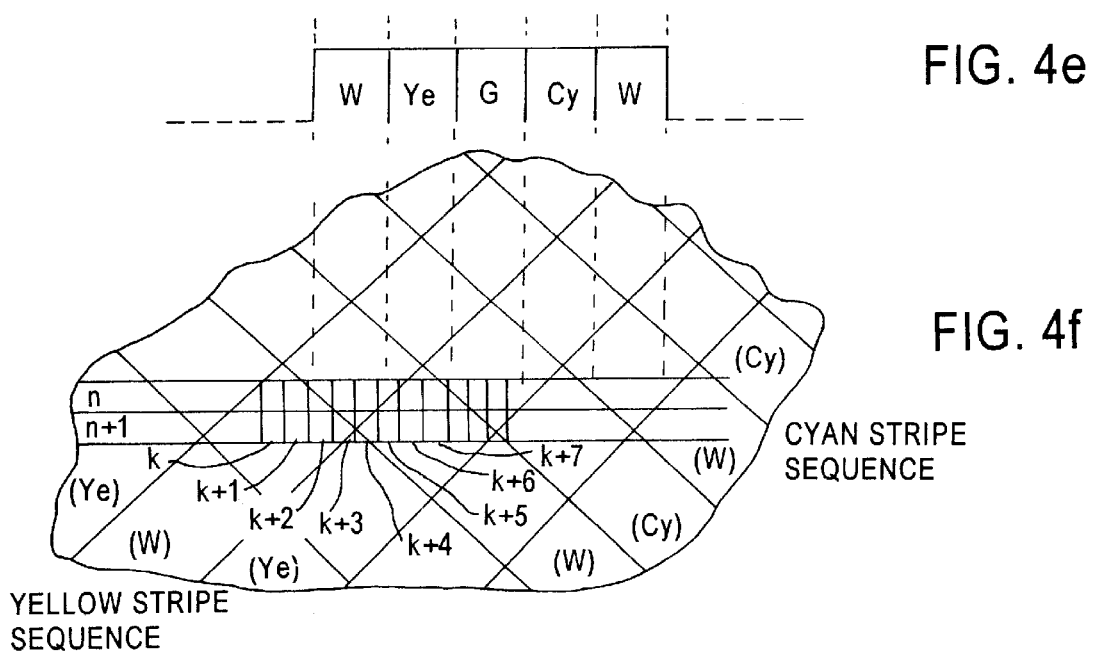
FIG. 4f

CAMERAS

FIELD OF THE INVENTION

This invention relates to cameras.

The invention is particularly applicable to cameras which produce colour video outputs (including false colour) such as may be fed to a colour display.

The invention is also particularly applicable to such cameras in which a single radiation-sensitive sensor is used to produce the colour video outputs. Typically the sensor is scanned in a raster or sampled as in a solid state array.

BACKGROUND OF THE INVENTION

Various proposals have been made to solve the problem of how to reproduce colours using a single sensor. One of the earliest proposals was Baird's system of aiming a monochrome television camera through a rotating filter, successive segments of which passed red, blue and green light. The receiver used a similar rotating filter synchronised with the one at the camera.

U.S. Pat. Nos. 2,733,291 and 3,378,633 disclose the concept of exposing monochrome light-sensitive devices (a vidicon in the case of the former and cine film in the case of the latter) to produce colour television outputs, each exposing the light-sensitive device through a filter consisting of stripes of two colours which repeat in the scanning direction at different frequencies. A tuned circuit is used to select the respective colour components in the output. In the latter patent, the filter consists of alternate clear and cyan vertical stripes, overlying alternate clear and yellow stripes inclined relative to the vertical stripes. This provides a grouping of four elemental colour areas which is repeated over the entire area of the filter and is imaged over the entire area of each frame of the cine film. Where the transparent stripes overlap, the light-sensitive device produces a signal corresponding to the full luminance signal. Where cyan (which passes green and blue light) overlaps yellow (which passes red and green light), only the green component of the scene is image. Where the cyan and yellow stripes overlap the transparent stripes, the light-sensitive device images the green and blue, and green and red components of the scene, respectively. It is sufficient for the repetition frequency of the yellow and cyan stripes in the direction in which the cine film is ultimately scanned in order to produce signals for a colour television receiver to be different (for example, by making one set of stripes vertical and the other set of dimensionally identical stripes inclined), for it to be possible to extract the components in the output of the scanned cine film by means of tuned circuits. Sufficient information is provided for a low resolution luminance component to be produced, in addition to three components corresponding to the primary colours (red, green and blue).

A disadvantage of the use of tuned circuits to extract the individual components in the output of the video waveform is that only modest pictures are produced due to cross-talk (cross-luma and cross-chroma).

When each cine frame is raster scanned in U.S. Pat. No. 3,378,633, the grey scale value of successive pixels on each line corresponds to that for the respective colour components i.e. white, yellow, green, cyan, in a fixed sequence. It has been proposed (Albert Macovski—Spatial-Frequency Encoding Techniques Applied to a One-Tube Colour Television Camera, IEEE Transactions on Broadcasting, Vol BC-16, No. 4, December 1970) to sample the grey scale of each pixel on each video line corresponding to the respective colour components, rather than to discriminate between the components using tuned circuits. However, geometrical errors resulting in indefinite registration between the filter and the cine film, and between the cine film and its scanner, would make it difficult to predict which colour components any group of pixels represents.

It may be noted that this disadvantage does not apply in a consumer video camera, in which successive pixels along each line of the solid state imager are covered by gelatine filters which are yellow, cyan, green or transparent, because the filters are physically secured to the imager in this case. This means that, say, the first pixel on line 1 represents the scene imaged through a yellow filter, and accordingly outputs of the imager corresponding to the respective colour components can be derived with certainty.

However, such an arrangement would not be possible if the sensor included an image intensifier. In this case the filters would have to be positioned in front of the image intensifier rather than in front of the solid state sensor, since the output of the image intensifier is itself monochrome.

The geometrical distortion produced by an image intensifier is such that it would be impossible to predict the colour sequence for each line of the solid state imager based upon the sequence of elemental colour areas in the filter.

In the case of a single-tube colour television image pick-up apparatus exposed through a colour stripe filter, it has been proposed to compensate for non-linearity in the tube's deflection system by the use of a frame memory (GB-A-2 135 853). The frame memory stores video signals corresponding to illumination of the tube with primary colours. These stored signals are used to compensate for non-linearities in the image pick-up mode of the tube. However, the video signals, while corrected for non-linearities caused e.g. by drift, are nevertheless low resolution.

It has been proposed ("Interplex—A New Versatile Full Resolution Single-Tube Colour TV Camera System", M Koubek, IEEE Transactions on Broadcasting Vol BC-22 No 3 September 1976, pp 30–35) to produce a high resolution single-tube camera. This is done by deriving a luminance signal which occupies a substantial proportion of the video bandwidth. A single-tube camera is exposed through a colour stripe filter, and separate colour outputs are produced, as in GB-A-2 135 853. The output of the single-tube is such a luminance signal, but the problem is that the stripe pattern is superimposed, and drastic filtering has been used in the past to remove the effect of the stripes. Because GB-A-2 135 853 uses vertical stripes, the respective colour information appears in the video bandwidth in the form of harmonics of the line frequency (which contains luminance information) and hence there is no way of separating the chrominance information and the luminance information, necessitating severe filtering of the bandwidth to produce a luminance signal. Koubek, however, uses obliquely orientated stripes, so the chrominance information is interleaved with the harmonics of the line frequency in the video bandwidth, and a comb filter is used to separate the chrominance and luminance information. This results in a luminance signal which is free of the shading pattern of the filter and thus has a bandwidth commensurate with the video bandwidth. However, the system relies on using a linear scan camera tube (i.e. good geometry). If the stripe pattern on the target became distorted, the bandwidth of the chrominance signals would increase and would no longer interleave the line harmonics.

SUMMARY OF THE INVENTION

It is an aim of the invention to permit high resolution colour video signals to be obtained using a single sensor, even if accompanied by an image intensifier, which would suffer from significant geometric distortion.

The invention provides a camera comprising a sensor for receiving radiation forming an image of a scene, filter means positioned in the path of radiation incident on the sensor, the filter means being arranged to pass different spectral regions in different spatial regions, so that different spatial regions of the sensor are exposed to radiation of different spectral regions, decoding means for producing separate outputs from the sensor corresponding to the different spectral regions, the decoding means being arranged to use stored signals derived from the sensor output corresponding to exposure of the sensor through the filter means by radiation of reference spectral regions, and a circuit for using the outputs corresponding to the different spectral regions to remove visibility of the different spectral regions from the sensor output, to permit high resolution to be attained.

In the case of visible radiation, the colour outputs are used to remove the filter pattern from the sensor output, thereby providing an improved bandwidth luminance signal. The storage of signals derived from the sensor output when illuminated by radiation of reference spectral regions enables the sensor output for an actual scene to be decoded accurately and avoids the need to predict which spatial areas of the sensor correspond to which spectral regions based upon geometrical considerations as well as avoiding the need for tuned circuits.

The colour outputs must of course be reasonably free from luminance cross-talk. One way of achieving this is to use a stripe filter the lines of which are orientated obliquely to the lines of the image.

Of course, the invention is not restricted to visible radiation and extends, for example, to I-R radiation for thermal imaging as well. In the latter case, the colour components fed to the display could be for the same colour components as for a video camera, but could be arranged to correspond, by the use of suitable spectral filters, to particular infra-red frequency bands. In this case, the image would be a false colour image, but having two or more images corresponding to different infra-red frequency bands could make an object easier to identify if displayed as false colours.

Advantageously, the camera includes a waveform generator for generating pulses derived from the stored signals which are applied to sample and hold means which receive a signal derived from the sensor output. One sample and hold means may be provided for each spectral region. The stored signal may be square waveforms derived from the sensor output, for example, programmed into a memory used by the waveform generator.

The sensor may include a CCD array, each spatial region which corresponds to a different spectral region including at least one, preferably at least four pixels.

In the case of a stripe filter, for visible radiation, there could be two sets of stripes, for example, yellow alternating with clear inclined at an angle to one side of vertical, with the other set, for example, cyan alternating with clear, inclined at the same or different angle to the other side of vertical. The invention is particularly applicable to a sensor which includes an image intensifier, for example, in order to provide a genuine colour image of a night-time scene. However, the invention is also applicable to sensors which respond in the infra-red or ultra-violet, in which case the camera would generate a false colour output.

BRIEF DESCRIPTION OF THE DRAWINGS

A camera constructed in accordance with the invention will now be described, by way of example, with reference to the accompanying drawings, in which:

FIG. 4a represents the waveform of the sensor output for a part of one line when imaging a blue scene;

FIG. 4b shows Waveform A, a square wave waveform derived from that of FIG. 4a;

FIG. 4c shows the waveform of the sensor output of a part of a line when the camera is illuminated by a red scene;

FIG. 4d shows Waveform B, a square wave waveform derived from the waveform of FIG. 4c;

FIG. 4e illustrates graphically how the individual colour components are obtained from waveforms A and B;

FIG. 4f shows a fragment of the filter projected onto a fragment of the CCD array as if no distortion were to take place;

DETAIL DESCRIPTION OF THE INVENTION

Figure 1:
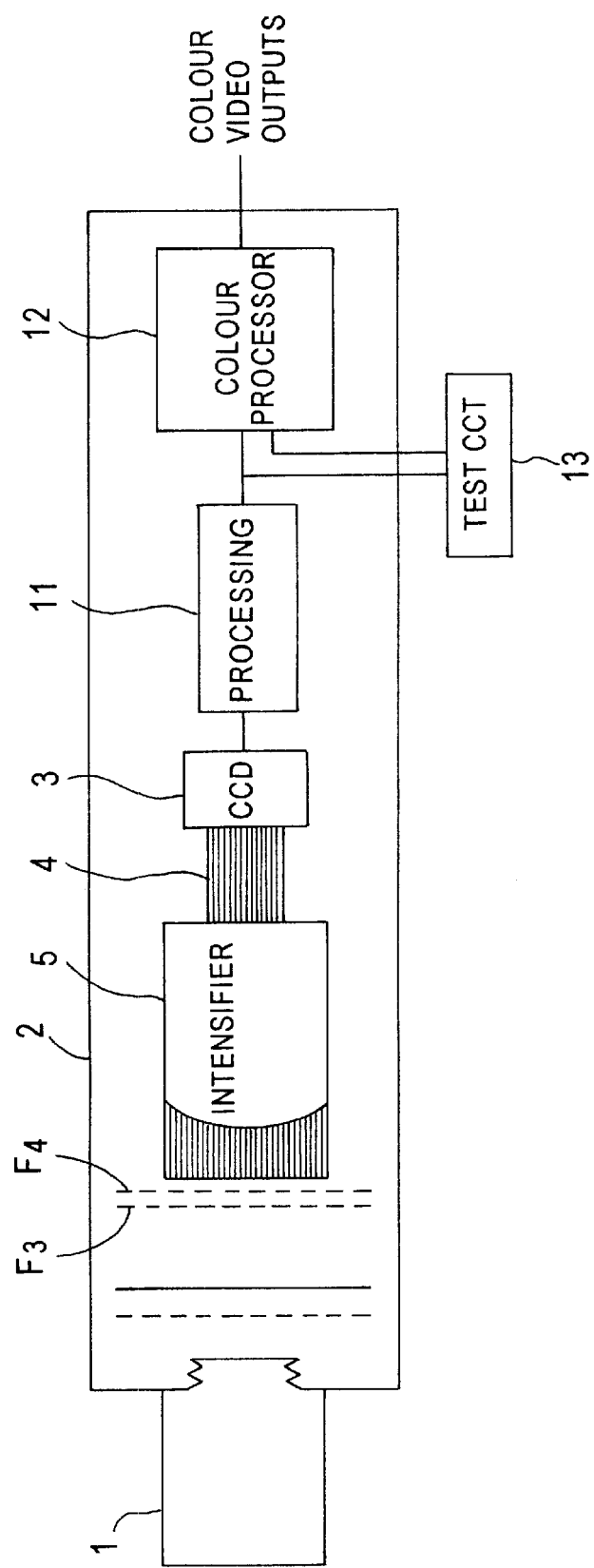
FIG. 1 is a schematic view of the camera.
Figure 2:
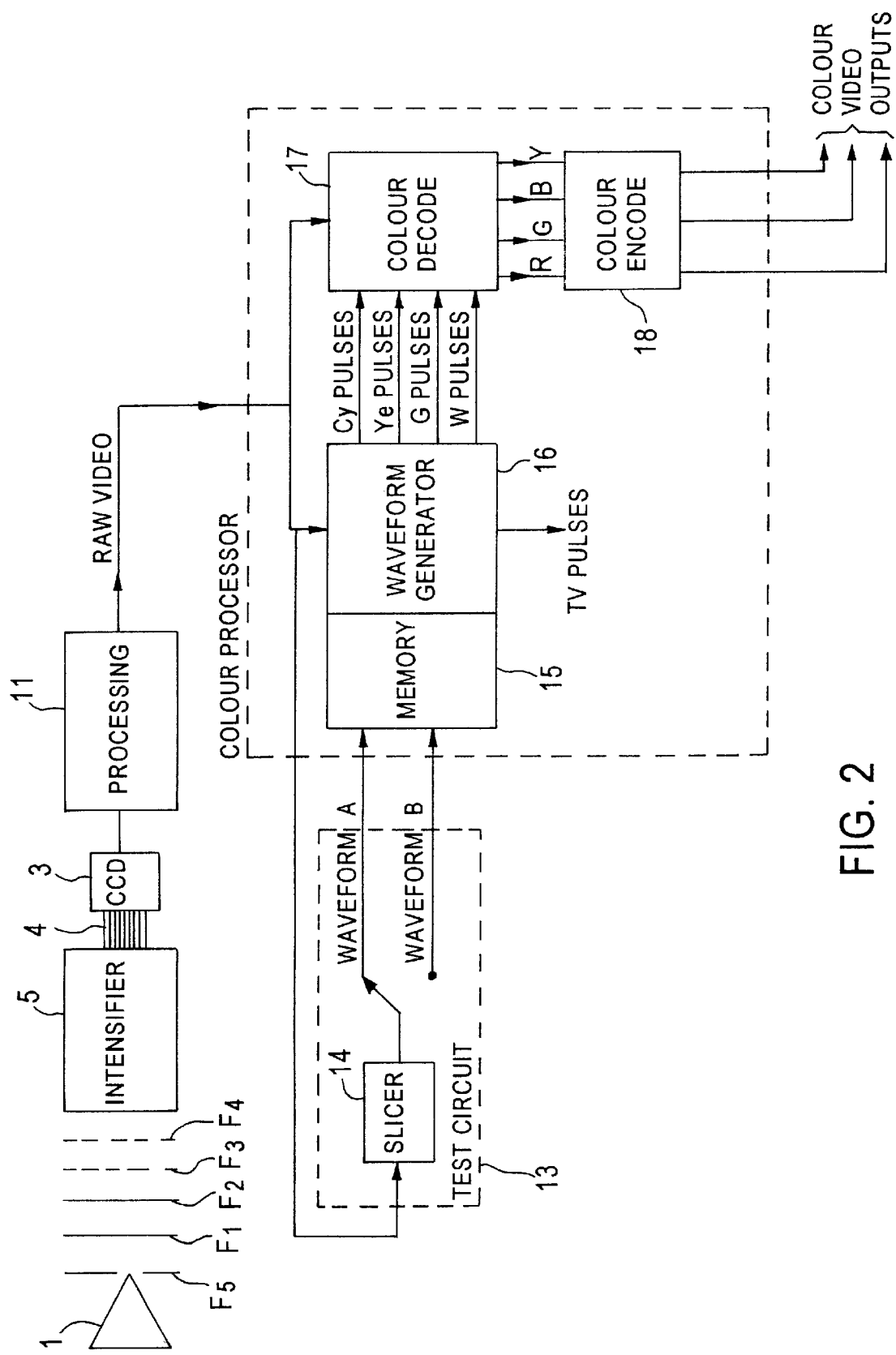
FIG. 2 is a block circuit diagram of the camera.

Referring to FIGS. 1 and 2, the camera produces colour video outputs. The camera has a lens 1 mounted in a casing 2, which contains a sensor comprising a CCD array 3 coupled by optical fibres 4 to the phosphors on the output surface of an image intensifier 5 at the focal plane of which filter means $F_3$, $F_4$ is cemented (the position of the filters has been exploded for clarity in FIGS. 1 and 2), the front part of the image intensifier also including a fibre optic coupling. $F_1$ is a correction filter which converts the spectral response of the sensor (i.e. the intensifier) to nominally photopic. The output of the CCD 3 undergoes processing in circuit 11 to produce a raw video output and then subsequent colour processing in circuit 12 to produce colour video outputs.

The CCD 3 and the image intensifier 5 being electro-optic devices, the spatial pattern of the colours of the filter means $F_3$, $F_4$ imaged onto the CCD 3 will not change with age or temperature and remains fixed once the camera has been manufactured. The colour processing uses stored signals based upon the response of the sensor to reference colours. These signals are generated after manufacture of each camera by means of test circuit 13. Once the signals have been stored, the test circuit is disconnected and the camera needs no further adjustment. If the intensifier were to be replaced over the lifetime of the camera, the manufacturer would have to reconnect the test circuit to programme in new stored signals.

The CCD 3 is a solid state device in the form of an array, a certain number of pixels to each line and a certain number of lines in the array. The scene is imaged in normal video fashion in frames, each consisting of two consecutive interlaced fields.

Figure 4G:
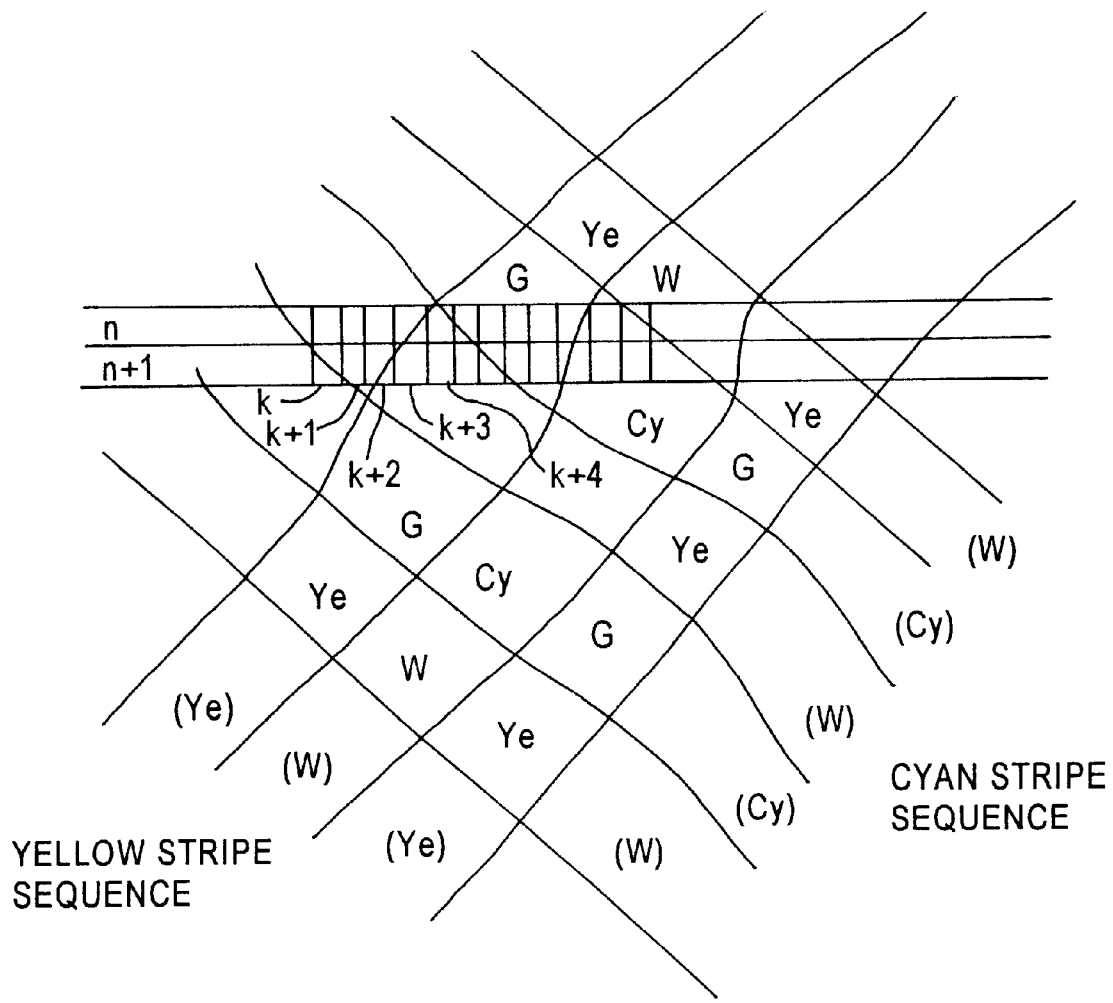
FIG. 4g shows a fragment of the filter projected onto a fragment of the CCD array showing typical distortion.
Figure 5:
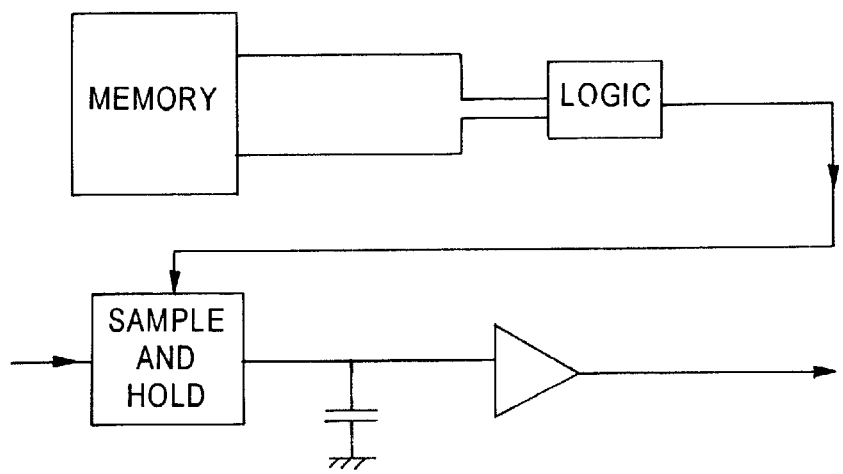
FIG. 5 shows the interconnection of the memory and Waveform Generator in more detail.

Referring to FIG. 4f, a fragment of the filter means is illustrated. The filter $F_3$ consists of diagonal yellow (Ye) stripes, the width and the spacing of which are equal to each other. In other words, between the stripes the filter is transparent (indicated W for white in the drawings). The filter $F_4$ consists of similarly arranged cyan (Cy) stripes spaced by transparent stripes. When the two filters are superimposed, a repeating pattern of four elemental colours is formed, as in the prior arrangements noted earlier.

If no distortions were produced by the lens 1, filters $F_1$, $F_2$, image intensifier 5, and fibre optic couplings, the spatial pattern of FIG. 4f would be projected onto the CCD array 3. For the purposes of explanation, fragments of two lines n, n+1 of the CCD array 3, beginning at pixel k for each line, are illustrated in FIG. 4f, as if the camera had distortion-free optics.

For line n, the kth pixel receives light from the image which has passed through the cyan filter, and so does the $k+1^{th}$ pixel. The next pixel, the $k+2^{th}$ partly receives imaging light through the cyan filter, and partly receives light through the transparent (white) filter. The $k+3^{rd}$ and $k+4^{th}$ pixels receive imaging light through the transparent filter. The next pixel ($k+5^{th}$) receives imaging light partly through the transparent filter and partly through the yellow filter, while the next two pixels receive light through the yellow filter. The $k+8^{th}$ pixel receives light through the yellow filter, partly through the cyan plus yellow (=green) filter, and the next two pixels only receive the light through the green filter.

Ignoring the pixels which receive light through the transition between two filter areas, the pixels of the $n^{th}$ line receive cyan, white, yellow and green, in a repeating sequence, as shown in FIG. 4e. The effect of the pixels which receive light from two filter areas can be reduced by taking the average of two lines for each of the yellow cyan and green signals. For a hypothetical non-distorting arrangement, the sequence of colours regularly repeats.

For line n+1, the sequence of colours exposed on the pixels again regularly repeats, but the sequence is now different. The $k^{th}$, $k+1^{th}$ and $k+2^{th}$ pixels receive light from the scene exposed through a cyan filter, the next two pixels, the $k+3^{rd}$ and the $k+4^{th}$ lie at the intersection of four filters, while the next four receive light through the yellow filter. The sequence for row n+1 is cyan, yellow, green.

For each line, for this hypothetical situation of no distortion, the pixels of each line are illuminated by areas of light, the colour of which varies in a fixed repeating sequence.

In reality, distortions are introduced by the lens, filters $F_1$, $F_2$, image intensifier 5, and by the fibre optic couplings. The pattern of the filter $F_3$, $F_4$ actually projected onto the CCD array could in a typical example, be more like the pattern of FIG. 4g. The kinks are a by-product of the use of optical fibres. Compared to the ideal pattern which would be projected by perfect optics, a real spatial region corresponding to a particular spectral region could be displaced by as much as 20 pixels along a line of 600 pixels.

It will be apparent that there will still be a unique sequence of colours through which successive pixels of each line are illuminated, but that the sequence will now no longer be regularly repeating and that there is no way of predicting what the (irregular) sequence for each line will be.

The raw video consisting of consecutive lines of each field is decoded in the sense of identifying those parts of a line which correspond to the scene viewed through each one of the four colours by using stored signals which are representative of the raw video output when the regularly repeating stripes are illuminated with primary reference colours. Thus, referring to FIG. 4a, the camera is first imaged on a uniform primary blue scene. Cyan, which is a combination of blue and green, will be transparent to the blue, whereas yellow, which consists of red and green light, does not pass blue light, and so the result will be (referring to FIG. 4f) blue regions which extend diagonally from the top of the drawing to the left of the drawing interspersed with similarly inclined dark regions. The blue stripes will result in the approximate sinusoidal variation shown for the fragment of one line in FIG. 4a. Illumination by a uniform red scene will result in red stripes extending diagonally from the top of FIG. 4f to the right interspersed with opaque stripes. Again a sinusoidal pattern will be produced (FIG. 4c), but out of phase with that for FIG. 4a. The raw video will be cyclic at the spatial (electrical) frequency of the cyan filter.

The lines shown in FIGS. 4a, 4c correspond to the hypothetical distortionless case for simplicity. With the actual pattern imaged on the CCD array, the traces FIGS. 4a and 4c will not be regular.

For each of the reference illuminations, the raw video from the CCD 3 is stored for a complete frame. What happens is that the approximately sinusoidal modulation passes through a slicer circuit 14 which produces waveform A from FIG. 4a and waveform B from FIG. 4c. These two waveforms are programmed into a memory 15 in the camera, each for a complete frame. The waveform generator 16 employs combinational logic on waveforms 4a and 4b to produce four waveforms, each containing just the pulses corresponding to one of the four colours i.e. yellow, green, cyan or white (FIG. 4e). For example, logic "and" produces the pulses corresponding to white illumination, logic "not-or" produces an output corresponding to green illumination, and so on. Thus, the memory contains, for each line of each frame, pulse trains which indicate the precise points in time at which the raw video corresponds to illumination by the respective colour. The memory may be a preprogrammed memory i.e. PROM or EPROM (which selects parts of the waveform according to spatial location). This is used then to separate out the colour components from the raw video from an actual scene.

Figure 6A:
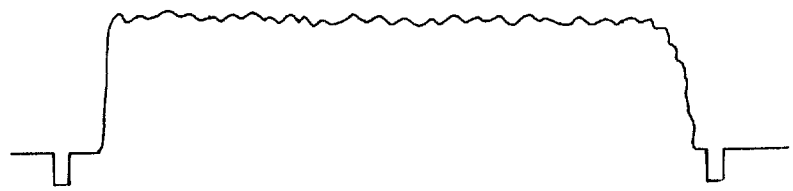
FIG. 6a shows a line of video signal.
Figure 6B:
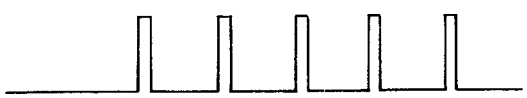
FIG. 6b shows one of the waveforms generated by the waveform generator.

Referring to FIGS. 5, 6a to 6c, the raw video for one particular colour of the actual scene enters the sample and hold, which is controlled by pulses for that colour which are generated by the waveform generator using combinational logic from waveforms A and B in the memory. One line of the scene may be as shown in FIG. 6a and the pulses which occur at the times when that line of the CCD are illuminated by one of the four colours shown in FIG. 6b. The output of the sample and hold is as illustrated schematically in FIG. 6c.

Figure 3:
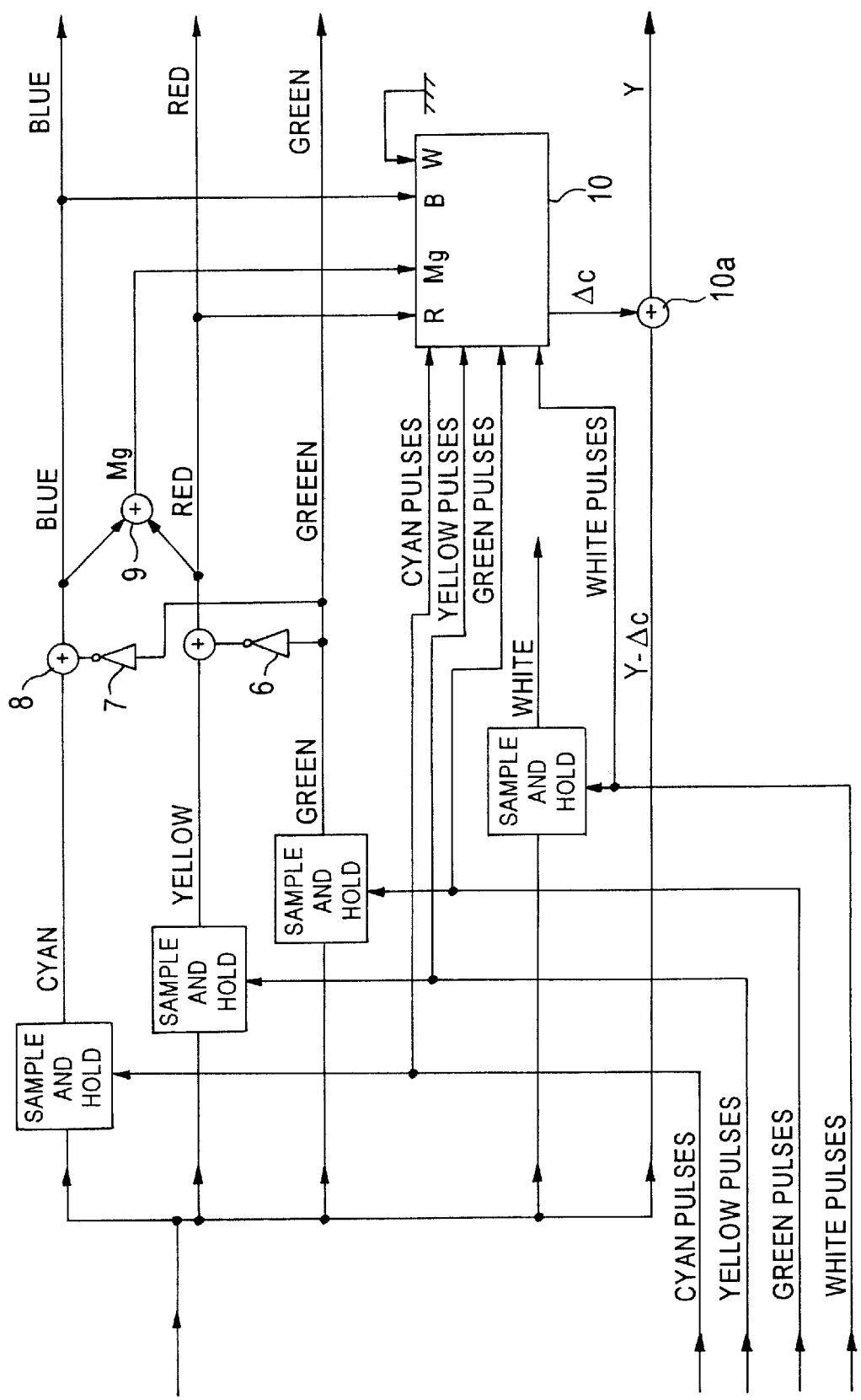
FIG. 3 is a block circuit diagram of the Colour Decode and Colour Encode of FIG. 2.

Referring to FIG. 3, the same is done for each of the four colour components, resulting in video waveforms corresponding to illumination through the cyan, yellow, green and transparent areas of the filter means. These four waveforms, from a non-volatile memory, will be produced every time the camera is operational. These are used to generate red, green, blue and luminance signals by matrix addition circuitry. Thus, inverter 6 and adder 7 subtract the green component from the yellow component, producing a red component. Inverter 6 and adder 8 subtract the green component from the cyan component to produce a blue component. At adder 9 the blue and red components are added to produce a magenta component. In addition circuit 10 the red, magenta and blue components are suitably added together to produce the colour interference component Δc. The white component need not be used.

Figure 7:
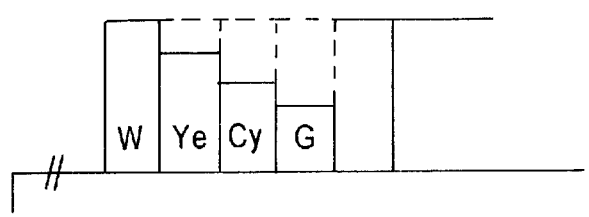
FIGS. 7 and 8 are colour bar charts discussed with reference to FIG. 3.
Figure 8:
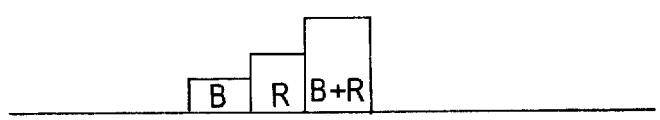

The reason for the addition of the colour interference component may be seen from FIGS. 7 and 8. If one imagines a colour bar chart for any particular line of the video where the successive bars are produced by imaging through the transparent, yellow, cyan and green filter areas, the overall intensity of the yellow, cyan and green areas is clearly less than that of the white areas, since the yellow area has subtracted blue, the cyan area has subtracted red, and the green areas have subtracted blue and red. The correct proportions for the red and blue are produced in circuit 10 to produce the corrected high resolution luminance signal Y at adder 10a. The low resolution luminance signal leaving box 11 (Processing) would represent the grey scale intensity of the scene, but would have the stripe pattern visible on it, forming a pattern as in FIG. 4g, but with various grey levels for the cyan, yellow and green areas. The matrix addition circuitry 10 removes the visibility of this stripe pattern from the raw video signal, producing a luminance signal having a bandwidth occupying a significant proportion of the video bandwidth.

Figure 6C:
FIG. 6c shows the output of the sample and hold when the waveform of FIG. 6a is input and the scanning pulses of FIG. 6b are applied.

The matrix addition circuitry 10 is gated by the cyan, yellow and green pulses to produce the appropriate Δc for the appropriate part of the raw video waveform. Thus, at the times (FIG. 6c) when the sample and holds produce an output for one particular colour, say, for green, Δc is added to the raw video at those instants to reflect the fact that the raw video is considerably reduced in intensity because the red and blue components have been stopped. The same happens at the instants at which the sample and holds for other colours produce outputs as shown in FIG. 6c. Clearly, Δc is zero when the white pulses arrive at the matrix addition circuitry. The action of the sample and hold circuits convert the incoming modulated waveforms into continuous waveform components of cyan, yellow and green without any discontinuities (i.e. gaps). The action of the adders 6, 7 produces the full set of primary signals, red, blue (and green), which are also continuous waveforms.

It should be added that the addition performed at adders 8, 9 and inverters 6, 7 produces primary colours which do not have luminance cross-talk. This is made possible by the non-vertical nature of the stripes.

The matrix addition circuitry 10 may include a clipping circuit to restrict Δc to 30% input white (Y) level at times when cyan is subtracted. Then if a noise spike is generated in the matrix addition circuitry 10, the noise spike is limited. Similarly, Δc can be restricted to 10% (of Y) at times when yellow is subtracted (see FIGS. 7 and 8).

The corrected luminance signal may be further improved by passage through a comb filter to remove residual colour energy. The luminance comb "stop bands" occur at frequency locations which are in between line harmonics. These locations depend on stripe angle and geometry errors. The benefit of the colour separation technique described is that significant suppression is achieved with poor geometry sensors. Further inclusion of a comb filter enables even better suppression and reduction of noise (both random and static). Poor geometry sensors could not use comb filters without the colour separator herein described.

It is desirable that the camera used for producing colour should have the following features, crystal timing, unity gamma, and good modulation at the highest stripe spatial frequency (i.e. 50% at 3.7 MHz).

The red, green, blue and luminance signals pass from the Colour Decode 17 into Colour Encode 18. Gamma correction is performed in this circuit, and a high pass filtered version of the luminance signal is added to each of the low resolution red, green and blue channels to produce three high resolution outputs (known as "mixed high"processing). The output of Colour Encode 18 is in three groups. The first group is three channels of red, green and blue video outputs together with synchronising waveforms. The second group is two channels of the luminance signal (Y) and the chrominance signal (C). The third group of channels is a single channel which is used to encode either PAL, NTSC or SECAM. Outgoing video from the decoder is T.V. standard encoded to suit external equipment (i.e. TV displays, video recording, r.f. links etc.).

The waveform generator 16 is also responsible for generating TV pulses such as synchronisation pulses, blanking pulses and clamping pulses etc.

A typical resolution of the CCD array could be around 600 pixels by 600 lines. For a conventional TV line frequency, which corresponds to a line period of 64 μs and an active line period of 52 μs, the maximum frequency which can be resolved along the lines would correspond to alternate black and white values i.e. 300 periods in 52 μs i.e. a maximum frequency of around 6 MHz. The response of the intensifier falls as the frequency increases and, for this reason, a typical frequency for, say, the cyan stripe is 3 MHz. This would correspond to two pixels for the cyan stripes, alternating with two for the interposed transparent stripes. Along a line of an array with pixels of 20μ by 20μ, this would give a stripe frequency of 12½ line pairs per mm (referenced to the CCD array) i.e. there would be 12½ cyan stripes and 12½ interposed transparent stripes per mm. Remembering that the stripes are advantageously inclined, say, at 22° on either side of the vertical centre-line of the array, this would equate to an actual line spacing of around 15 line pairs per mm for both the cyan and yellow stripes.

Defocus filter $F_2$ reduces alias disturbance of scene detail, and may be a lenticule, birefringent plate, Savart plate or cylindrical lens. For surveillance use (i.e. long focal length lenses, zoom lenses etc) this filter can be omitted.

The shading errors of the intensifier are a fixed signature of the sensor and can thus be optically corrected. During camera manufacture, the shading errors can be measured (see the roll-off at the end of the line in FIG. 4a), and an inverse profile pattern can be produced (by for example a computer line transparency printer). It is beneficial to perform shading correction optically using filter $F_5$ rather than electronically as this avoids errors from scenes of low contrast.

It will be seen that the proposed system uses a technique which allows sampling extraction to derive colour waveforms. It is believed that this approach is superior to all other approaches as it enables poor performance cameras to be used.

The innovations are the method of deriving the sample patterns, the method of storing the sample patterns, the method of removing colour errors from luminance signals (i.e. Δc cancellation), the method of removing luma errors from chroma signals (i.e. colour separation) and the method to remove shading.

The technique has the following benefits: improved luma cross-talk i.e. the rejection of colour signals onto the luma channel will be constant over the total area of the picture; improved chroma cross-talk, the rejection of colour cross-talk of one colour onto another will be constant over the total picture area (colour shading will not arise or "constant luminance" will exist); the rejection performance will not degrade with either temperature or age (a feature of intensifiers); the technique can be implemented by totally digital techniques (i.e. low cost, small size and stable performance); the intensified colour pattern can be small in size, low on power and low cost; improved rejection can be achieved by adding further filtering by using one or two TV line comb filters; white highlights in the scene or dark parts of a scene will not be coloured "green" i.e. the system has a desirable "fade-to-grey" feature; choice of striped filters is not dependent upon compromising performance e.g. stripe angles could be ±45° for NTSC systems, ±22.5° for PAL systems or even between ±20° to ±30°. The pitch stripe frequency can be the same for both colours (cyan and yellow). This allows the stripe frequency to be low (e.g. 2.5 MHz), thereby allowing the use of poor resolution modulation transfer function sensors such as intensifiers; the colour beat pattern i.e. frequency difference between colour filters will be hardly perceptible throughout the total picture area as the sample pulses are synchronised to the patterns—cameras with poor geometry performance (10%) can be used as the colour performance is not impaired by geometry; and colour errors caused by poor corner focussing (i.e. astigmatism) will be seen as lesser colour saturation rather than colour (hue) errors—the shading corrector (optical) lessens the saturation error. Examples of intensifier types for use with this technique are: first generation; second generation; or electron bombarded CCD. Intensifiers with a cover glass (e.g. third generation) can be used with a relay lens. The point here is that the focal plane lies within the casing of the intensifier making it impossible for the filter to be secured at this point. The relay lens puts the filter at the focus of the relay lens which is itself focuses at the focus of the intensifier. All sensors should have a linear transfer function i.e. unity gamma.

The camera is not limited to use with an intensifier, and could be used on a CCD without the intensifier. Further, types of solid state sensor other than CCD could be used.

While the description has been in relation to the use of cyan and yellow stripes, it would be possible to use any combination of two subtractive primary colours, or three subtractive primary colours could be used, possibly without the transparent regions, and primary colours themselves could be used, but this would reduce performance considerably. The reference illuminating colour would of course depend upon the colours in the filter. Other angles of the stripes and spacings could be used. Further, instead of having two sets of stripes inclined on each side of vertical, one set of stripes, for example, cyan, yellow, green and clear, or red, green and blue, inclined obliquely to the lines, could be used. Also, patterns other than stripes could be used as circles, hexagons etc.

Finally, the invention is applicable to wavelengths outside the visible range, for example the infra-red range where the filters $F_3$ and $F_4$ will correspond to particular infra-red spectral regions in the way that the yellow and cyan stripes correspond to particular visible regions, resulting in a false colour picture where objects emitting in three different frequency ranges are separately shown.

What is claimed is:

1. A camera comprising a sensor, said sensor comprising a series of pixels for receiving radiation forming an image of a scene, filter means positioned in the path of radiation incident on the sensor, said filter means being arranged to pass different spectral regions in different spatial regions, so that different spatial regions of the sensor are exposed to radiation of different spectral regions, decoding means for producing separate outputs from the sensor corresponding to the different spectral regions, memory means for storing sensor output signals and a circuit for using the outputs corresponding to the different spectral regions to remove visibility of the different spectral regions from the sensor output, to permit high resolution to be attained, in which said decoding means is further arranged to use stored signals derived from the sensor output corresponding to exposure of the sensor through the filter means by radiation of referenced spectral regions, said stored signals being representative of the position of the reference spectral regions with respect to the position of said pixels.

2. A camera as claimed in claim 1, the decoding means further including a waveform generator for generating pulses derived from the stored signals which are applied to sample and hold means which receive a signal derived from the sensor output.

3. A camera as claimed in claim 1, in which the stored signals are square waves derived from the sensor output.

4. A camera as claimed in claim 1, in which the sensor is arranged to produce an output representative of lines of the image, and the filter means comprises stripes orientated obliquely to the lines of the image.

5. A camera as claimed in claim 4, in which the stripes are formed of two sets, one set comprising stripes passing one spectral region alternating with stripes passing all spectral regions of the sensor, and the second set comprising stripes passing another spectral region alternating with stripes passing all spectral regions of the sensor.

6. A camera as claimed in claim 5, in which the said one spectral region and the said other spectral region are subtractive primary colours, and the alternating stripes are clear.

7. A camera as claimed in claim 6, in which the subtractive primary colours are yellow and cyan.

8. A camera as claimed in claim 5, in which the pitch of the stripes and the alternating regions are equal, and each set of stripes is inclined at an angle to the line direction.

9. A camera as claimed in claim 5, in which the sets of stripes are inclined to different sides of a notional vertical line of the image.

10. A camera as claimed in claim 1, in which the reference spectral regions are primary colours.

11. A camera as claimed in claim 5, in which the filter means lies at the image plane of the sensor or at the focus of a relay lens for the sensor.

12. A camera as claimed in claim 1, in which the sensor includes an image intensifier.

13. A camera as claimed in claim 12, in which the sensor includes a solid state imager.

14. A camera as claimed in claim 1, in which the sensor is an infra-red sensor.

* * * * *